(No Model.) 9 Sheets—Sheet 1.
G. R. LEAN & J. R. MASSEY.
APPARATUS FOR MANUFACTURING INCANDESCENCE ELECTRIC LAMPS.
No. 568,142. Patented Sept. 22, 1896.
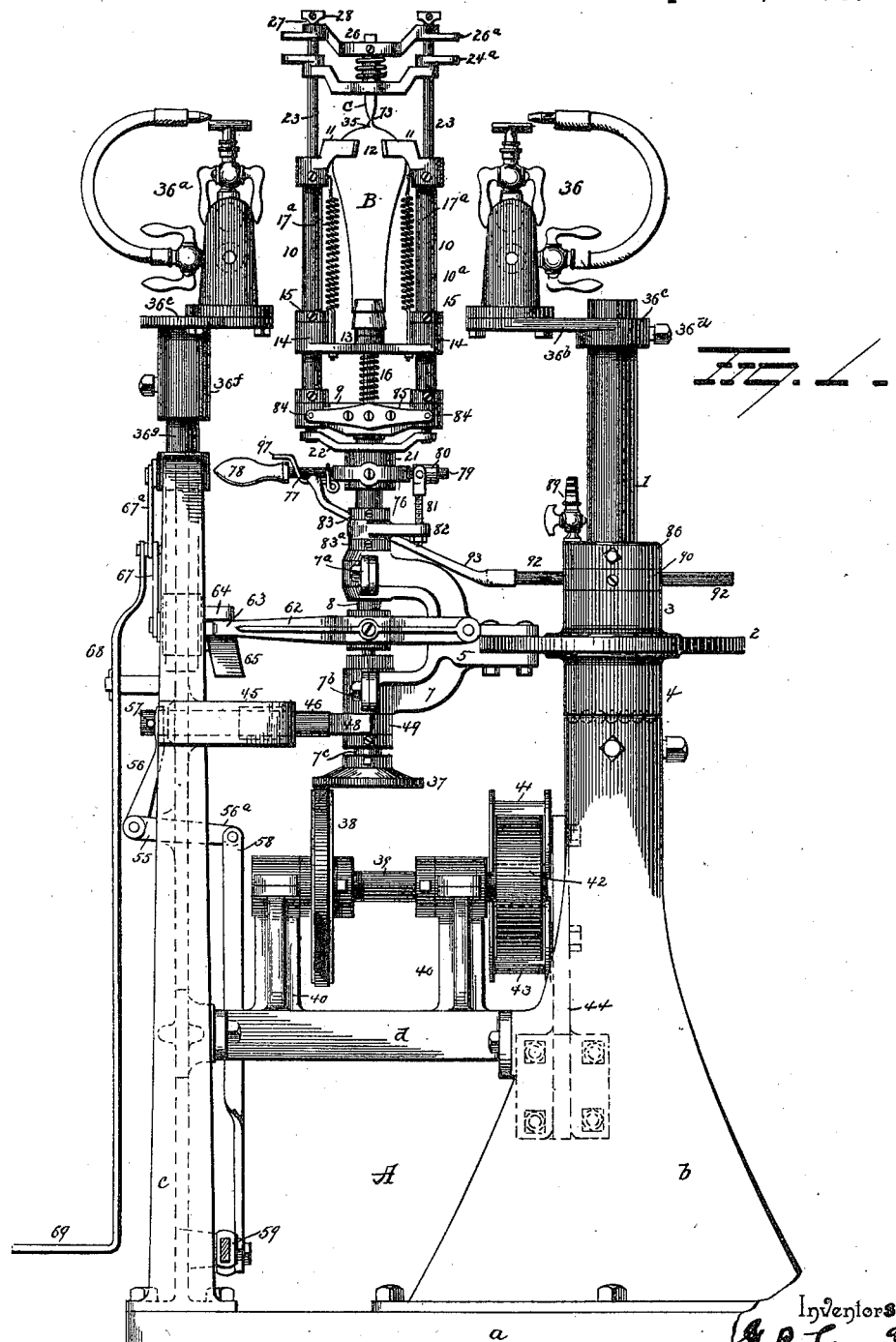
Witnesses
E. J. Nottingham
G. F. Downing
Inventors
G. R. Lean
J. R. Massey
By H. A. Seymour
Attorney

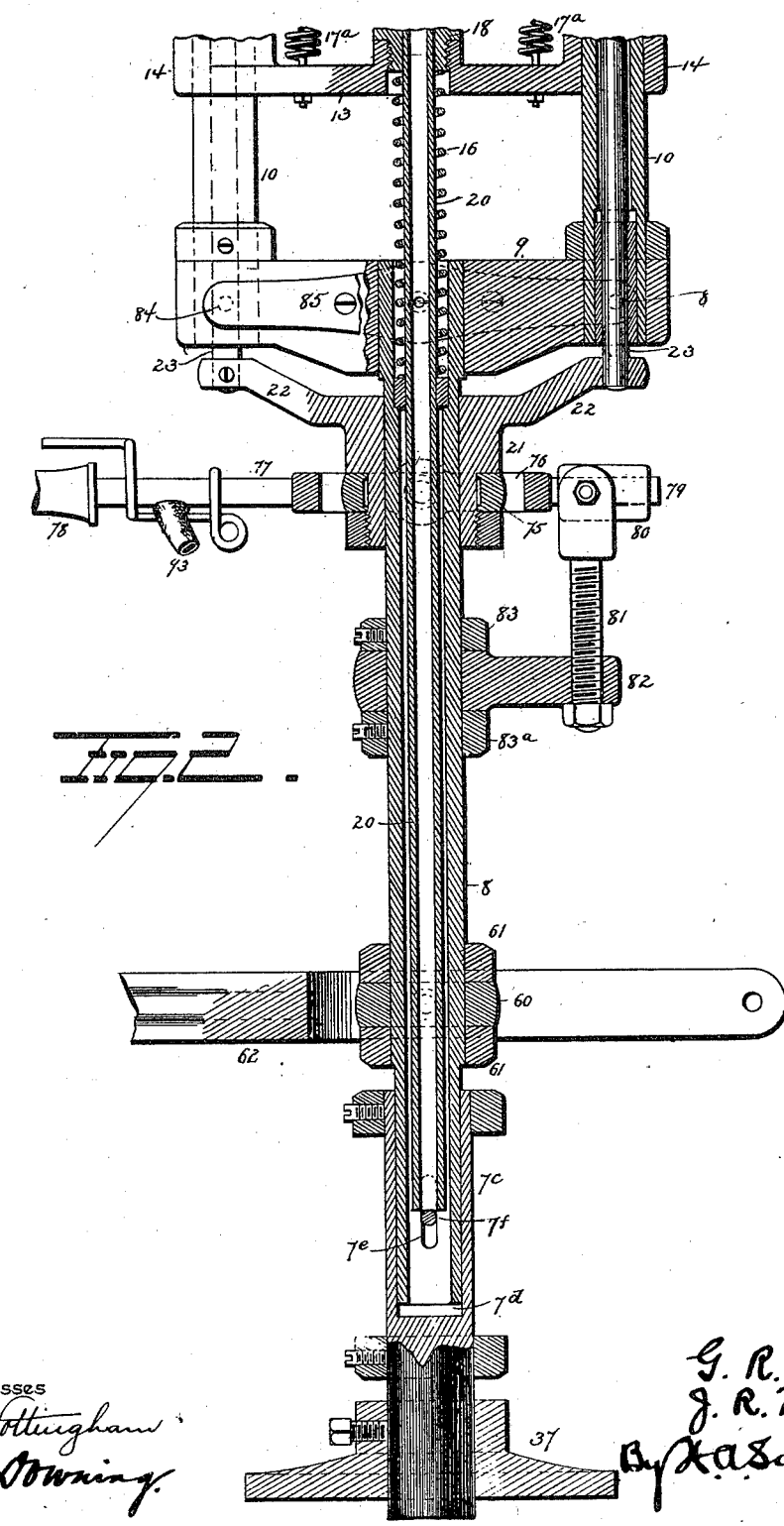

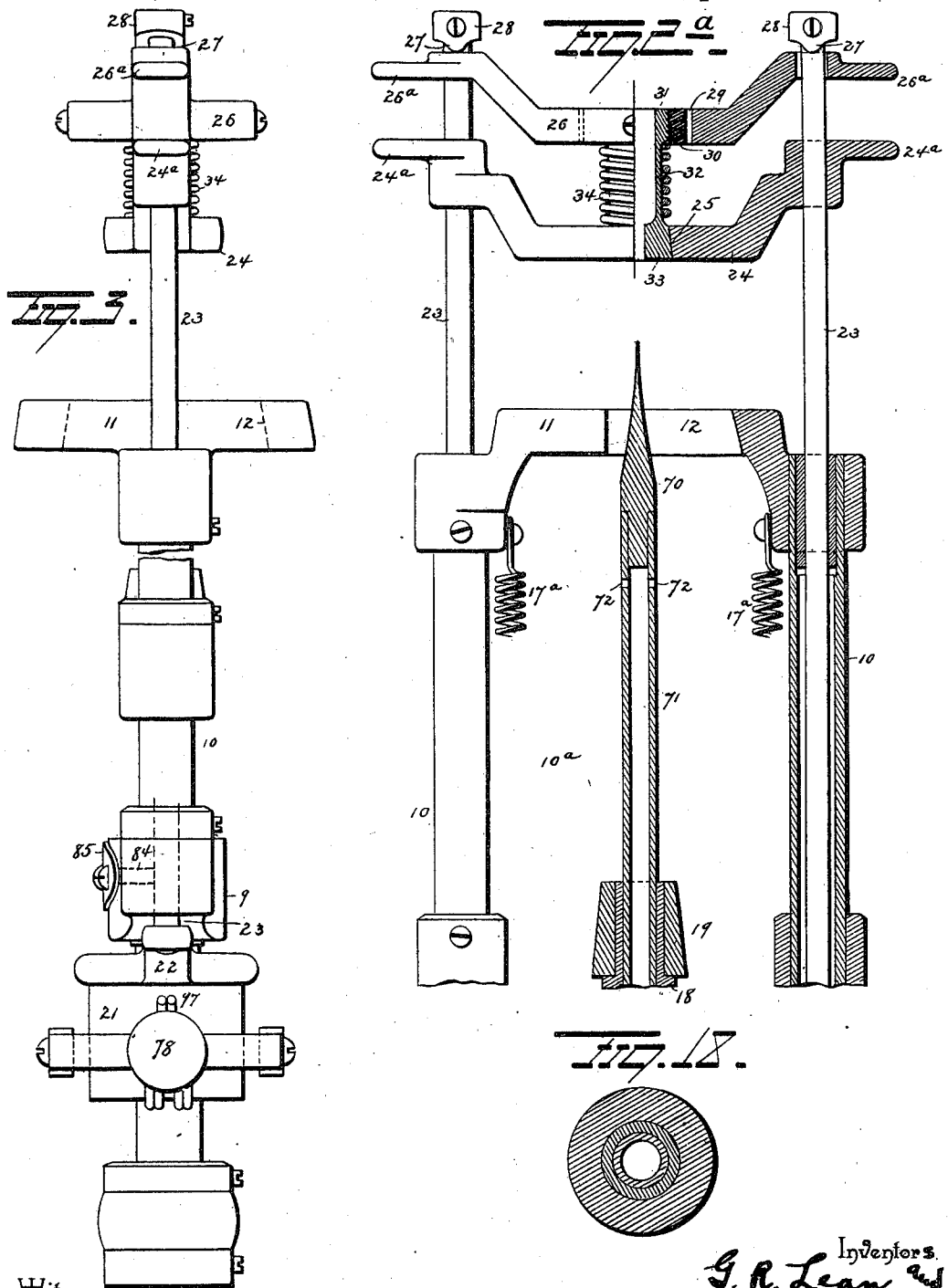

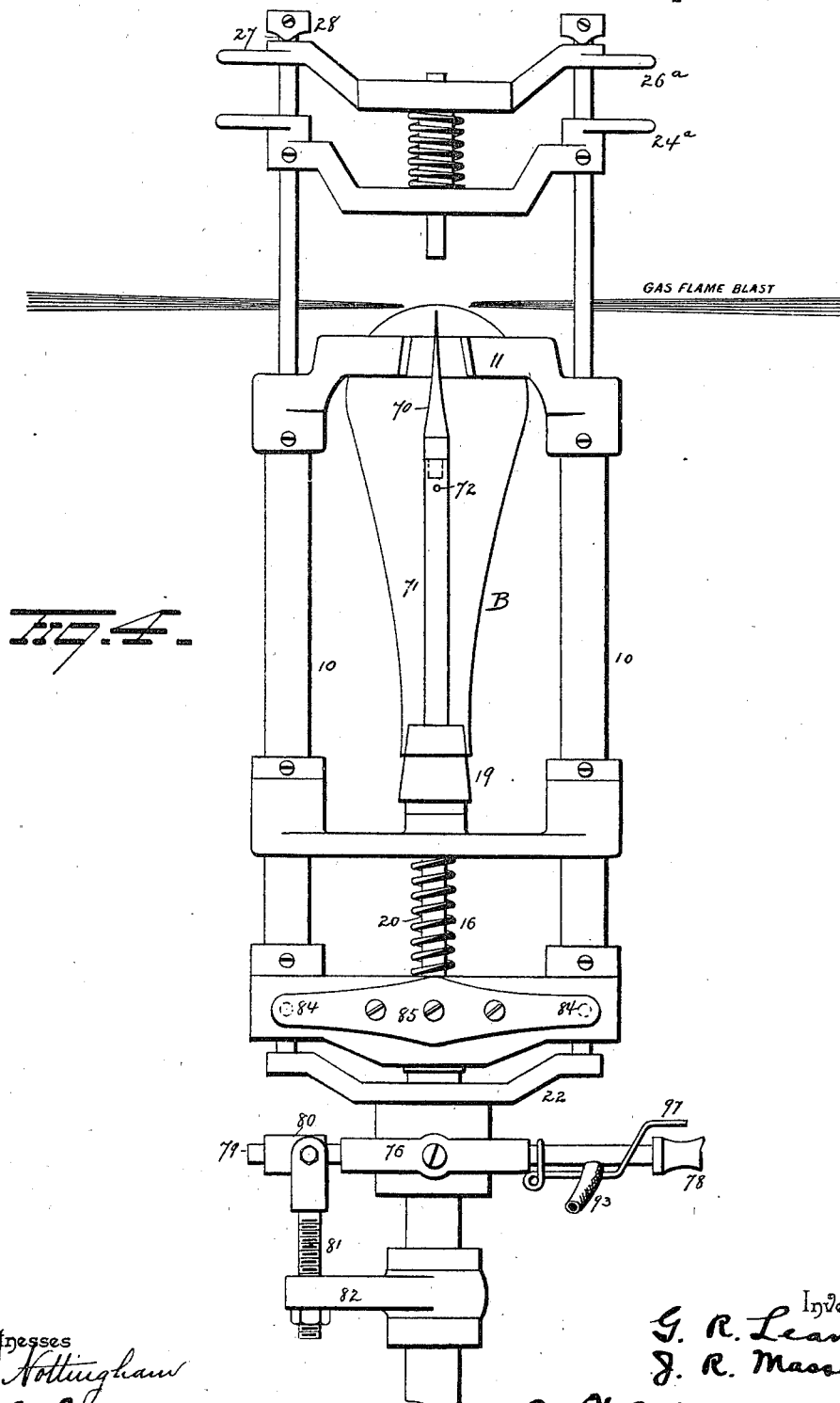

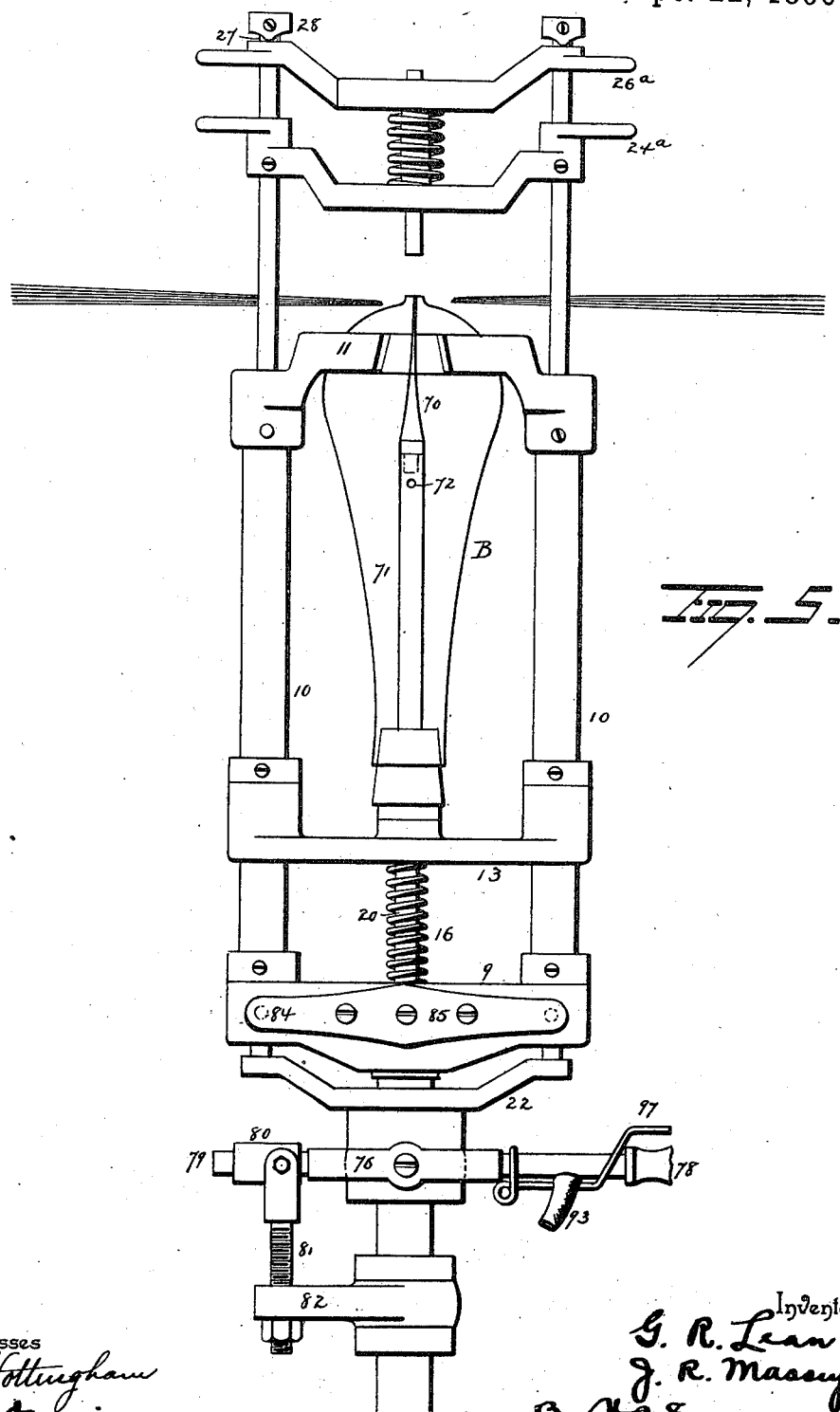

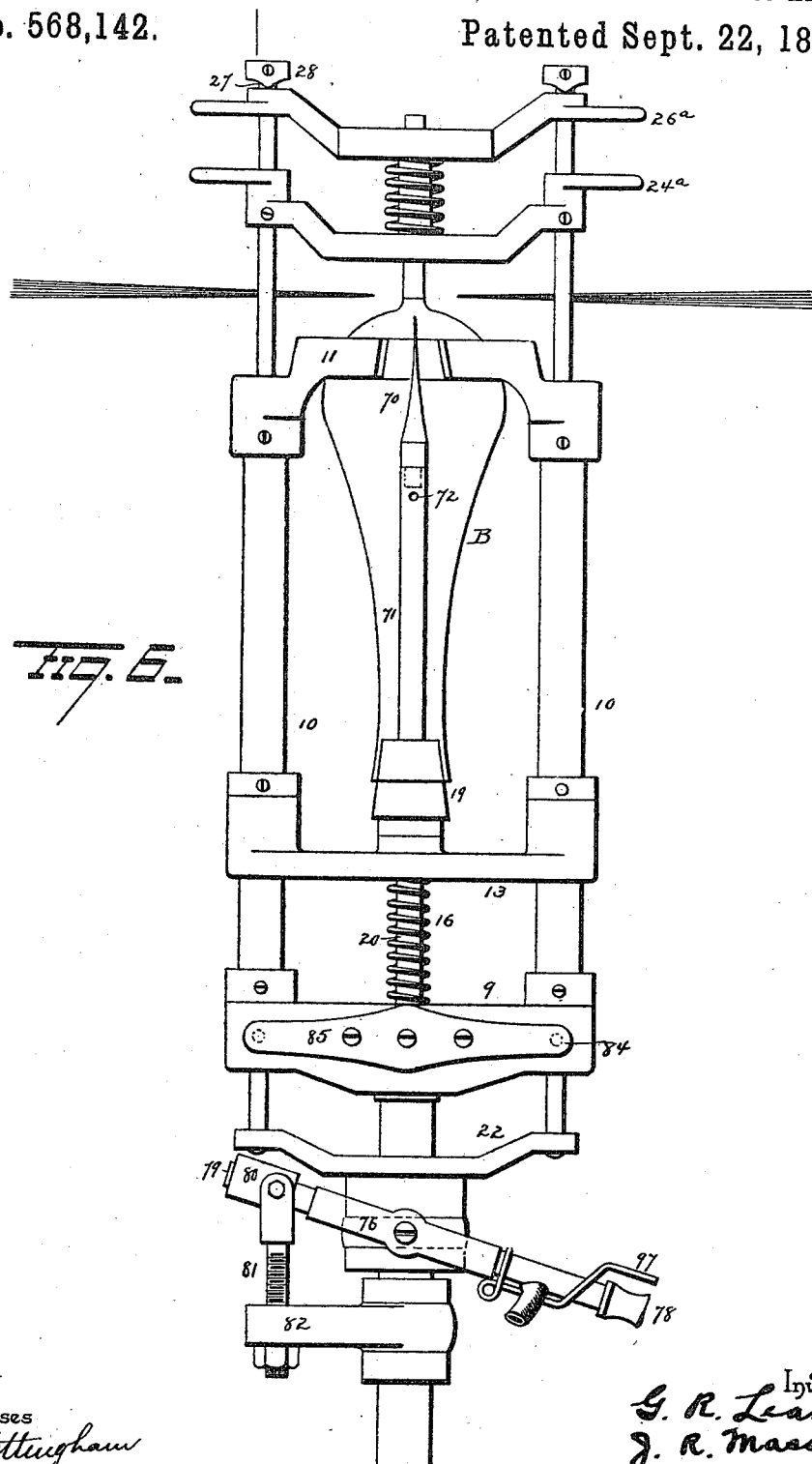

(No Model.) 9 Sheets—Sheet 7.
G. R. LEAN & J. R. MASSEY.
APPARATUS FOR MANUFACTURING INCANDESCENCE ELECTRIC LAMPS.
No. 568,142. Patented Sept. 22, 1896.
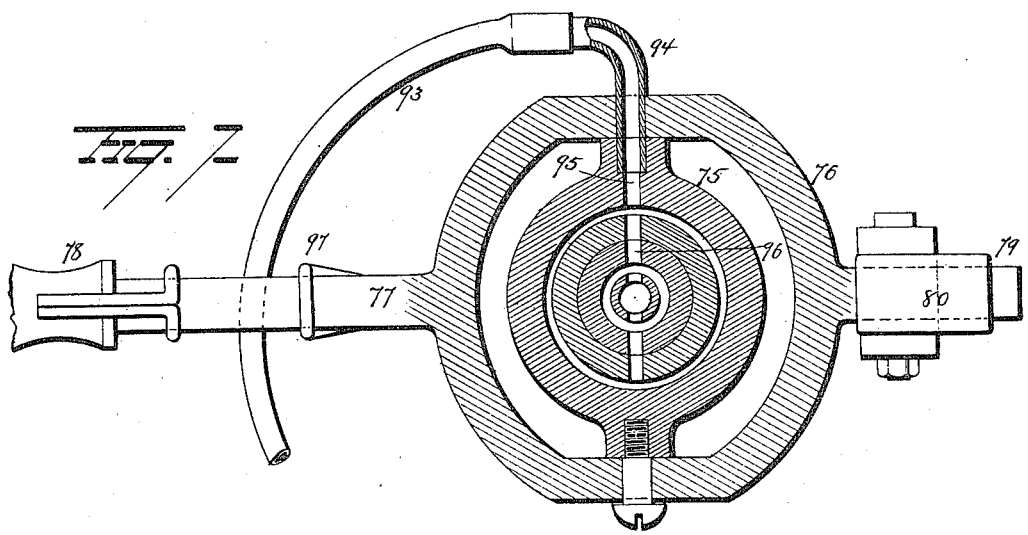
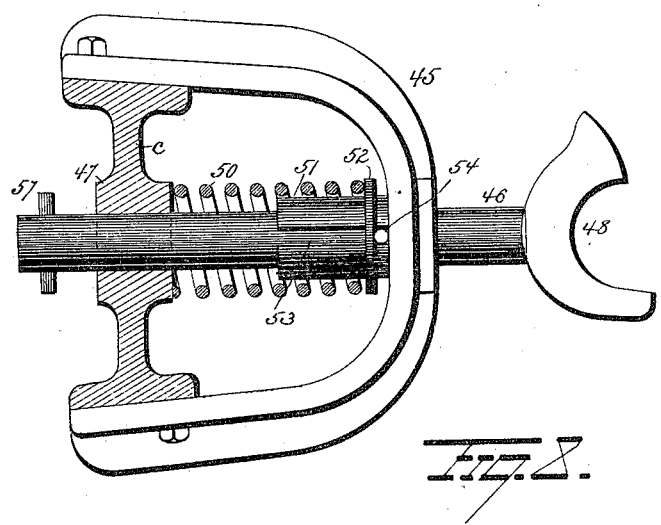
Witnesses
E. J. Nottingham
G. F. Downing
Inventors
G. R. Lean
J. R. Massey
By H. A. Seymour
Attorney

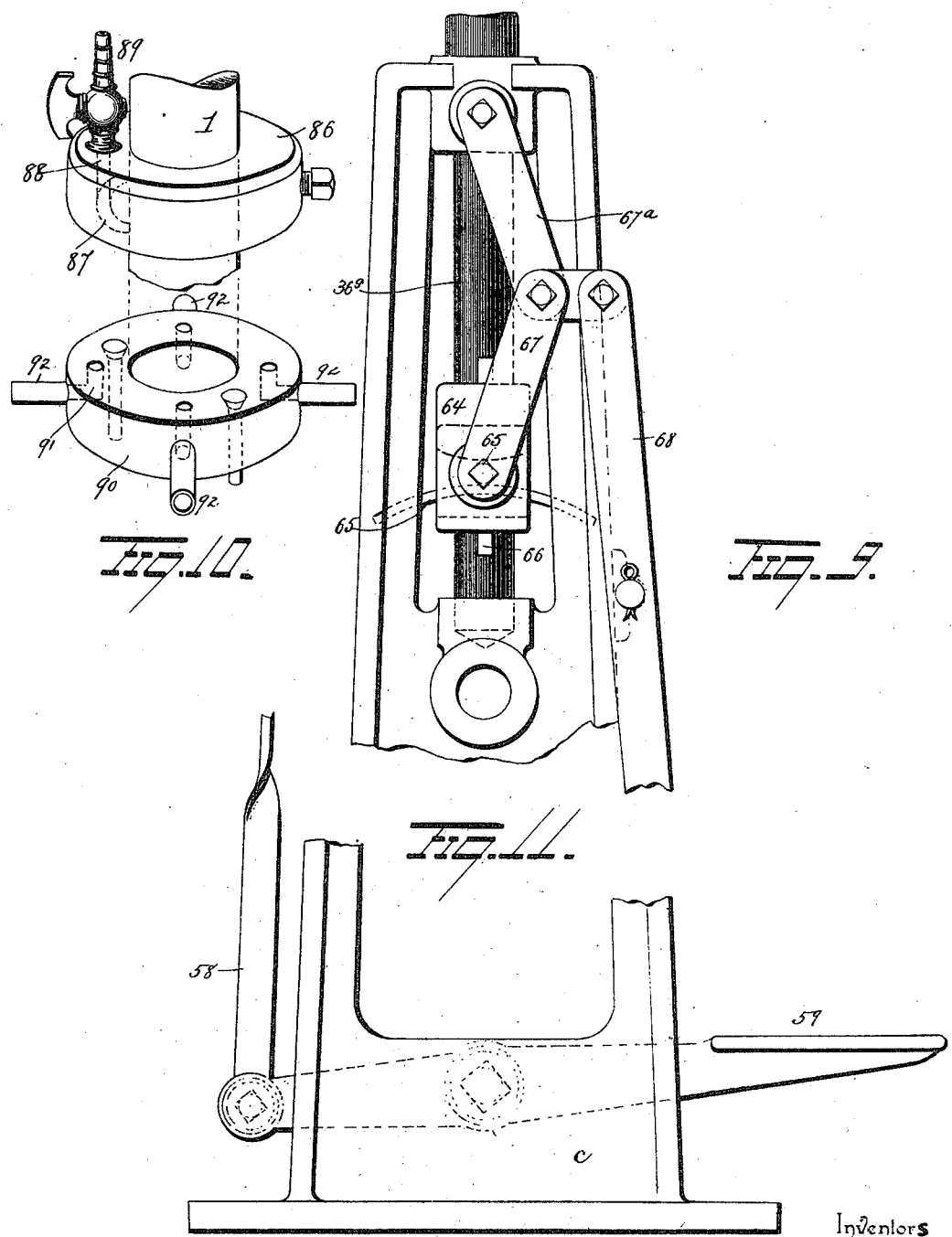

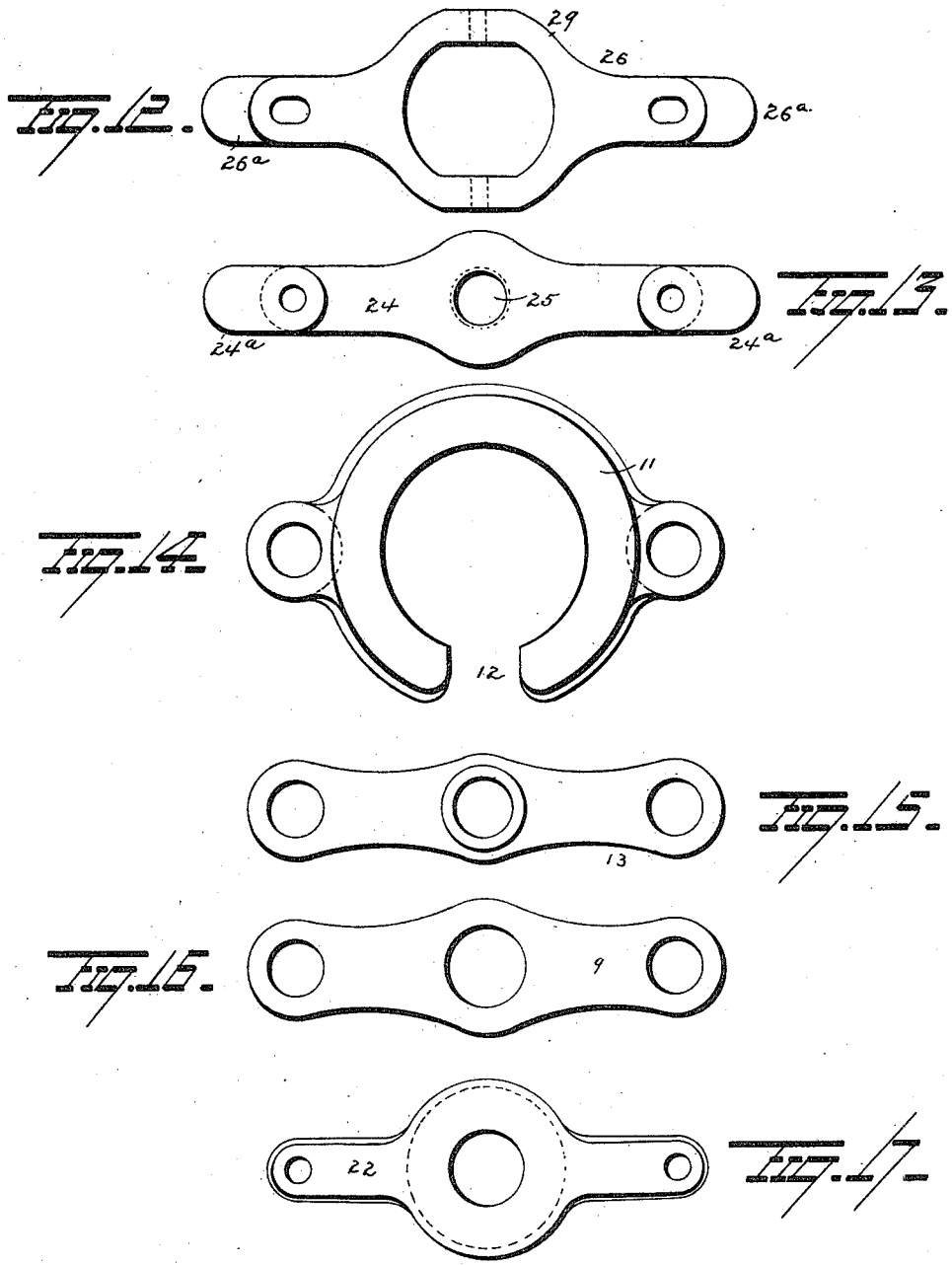

UNITED STATES PATENT OFFICE.

GEORGE R. LEAN AND JOHN R. MASSEY, OF CLEVELAND, OHIO, ASSIGNORS TO THE BUCKEYE ELECTRIC COMPANY, OF SAME PLACE.

APPARATUS FOR MANUFACTURING INCANDESCENCE ELECTRIC LAMPS.

SPECIFICATION forming part of Letters Patent No. 568,142, dated September 22, 1896.

Application filed December 21, 1895. Serial No. 572,919. (No model.)

*To all whom it may concern:*

Be it known that we, GEORGE R. LEAN and JOHN R. MASSEY, residents of Cleveland, in the county of Cuyahoga and State of Ohio, have invented certain new and useful Improvements in Apparatus for the Manufacture of Incandescence Electric Lamps; and we do hereby declare the following to be a full, clear, and exact description of the invention, such as will enable others skilled in the art to which it appertains to make and use the same.

Our invention relates to an improvement in apparatus for use in the manufacture of incandescence electric lamps, and more particularly to means for applying tubes to incandescence-lamp bulbs for attachment of an exhaust-pump, the object of the invention being to produce mechanical devices by means of which a tube can be easily, quickly, accurately, and economically applied to the bulb of an incandescent electric lamp.

With this object in view the invention consists in the combination, with means for holding a glass bulb and means for applying a flame to said bulb, of means for injecting air into said bulb whereby to cause a hole to be formed at the point made soft by the flame.

The invention also consists in the combination, with means for holding an incandescence-lamp bulb and means for applying heat to the large end thereof, of devices for injecting air into said bulb whereby to cause a hole to be formed in the enlarged end of the bulb in line with the axis thereof.

The invention further consists in the combination, with means for holding the bulb of an incandescence electric lamp, of means for subjecting the large end of the bulb to heat whereby to soften it, means for revolving the bulb while being subjected to heat, and means for forming a hole in said softened end of the bulb.

The invention further consists in the combination, with means for forming a hole in the enlarged end of the bulb of an incandescence lamp, of devices for welding a tube to said bulb so as to communicate with said opening.

The invention further consists in the combination, with devices for holding the bulb of an incandescence electric lamp and devices for holding a tube to be welded to said bulb, of means for moving both sets of devices independently of each other.

The invention further consists in the combination, with devices for holding the bulb of an incandescence electric lamp and devices for holding a tube to be applied to said bulb, of means for revolving all of said devices, and means for moving said sets of devices independently of each other while they are revolving, substantially as set forth.

The invention also consists in the method of tubulating incandescence-electric-lamp bulbs, consisting in softening the enlarged end of the bulb, forming a hole in said softened portion of the bulb, welding a tube to the bulb so as to communicate with said hole, and drawing out said tube so as to form a small tubular extension on the bulb; and the invention also consists in certain novel features of construction and combinations and arrangements of parts, as hereinafter set forth, and pointed out in the claims.

In the accompanying drawings, Figure 1 is an elevation showing the application of our improvements, the parts being shown in the positions which they assume when the tube shall have been applied to the bulb. Figs. 2 and 2ª show enlarged views, partly in section and partly in elevation, of one system of devices for holding and manipulating the bulb and tube. Fig. 3 is an edge view of the major portion of the devices shown in Fig. 2. Figs. 4, 5, and 6 are views showing positions of the parts at different stages of the method of preparing the bulb and attaching the tube thereto. Fig. 7 is a cross-section on the line $xx$ of Fig. 1. Fig. 8 is a detail view showing the device for holding the mechanism in its operative position. Fig. 9 is an enlarged detail view of a portion of the devices for raising and lowering the parts which support the bulb. Figs. 10, 11, 12, 13, 14, 15, 16, 17, and 18 are views illustrating various details.

A represents the main frame of the machine and comprises a base $a$, a main standard $b$, bolted to the base, a standard $c$, secured to the base $a$ at a suitable distance from the main standard $b$, and braces or cross-bars $d$, connecting said standards $b$ and $c$. A post or shaft 1 projects upwardly from the standard $b$, and near the lower end of said post or shaft $a$ revoluble disk or table 2 is disposed. The disk or table 2 is held between two collars 3 4, and between the collar 4 and the upper end of the standard $b$ ball-bearings are disposed.

To the revoluble disk or table 2 several series of devices (four, more or less) for holding and manipulating the bulb and the tube to be applied thereto are secured. Each of these series of devices is identical in construction with the others, and a detail description of one series will suffice for all.

The several series of devices above referred to are supported from the disk or table 2 by means of laterally-projecting arms 5, secured to the disk or table at equivalent points. Each arm 5 is bifurcated at its inner end to receive the disk or table, and is secured to the latter by means of bolts. The arm 5 terminates in a yoke 7, having bearings $7^a$ $7^b$ for the accommodation of a vertically-disposed tubular shaft 8. The bearing $7^a$ receives the tubular shaft 8, per se, but the bearing $7^b$ receives a short shaft $7^c$, having a socket $7^d$, in which the shaft 8 has a vertically-sliding fit. The shafts 8 $7^c$ will be made to rotate together by means of a pin $7^f$ passing through them, the shaft 8 being made with a slot $7^e$, through which the pin passes, thus permitting the shafts to have an endwise movement relatively to each other.

To the upper end of the shaft 8 a cross-head 9 is secured. Tubular uprights 10 are secured to the ends of the cross-head 9, and the upper ends of said tubular uprights are connected together by an annular cross-head 11, having a slot or opening 12, said annular cross-head serving to receive and embrace the upper end of the bulb B to be operated upon, as more fully explained farther on. The cross-heads 9 11 and the tubular uprights 10 thus form a vertically-disposed rectangular frame $10^a$, between the ends of which a movable cross-head 13 is located.

The cross-head 13 is provided at its ends with perforated bosses 14, through which the uprights 10 pass, and the upward movement of the cross-head 13 is limited by means of collars 15 on the uprights 10. The bosses 14 are normally forced toward said collars by a coiled spring 16, the upper end of which bears against the cross-head 13 and the lower end against a collar 17 in the upper end of the vertical tubular shaft 8. In practice we prefer to employ additional springs $17^a$ for raising the movable cross-head, one end of each of said springs $17^a$ being attached to the movable cross-head and the other ends to the upper cross-head 11. The cross-head 13 is made at its center with an internally-screw-threaded boss for the reception of the hollow core 18 of a rubber stopper 19, which latter is adapted to enter the neck of the bulb B, as shown in Figs. 1, 4, 5, and 6, and support the bulb, the latter being held steadily in a perpendicular position by the annular cross-head 11. A tube 20 is secured at its upper end to the hollow core of the stopper 19 and communicates with the opening therein, said tube extending down loosely through the hollow shaft 8 and adapted at its lower end to rest on the pin $7^f$, which passes through the shafts 8 and $7^c$.

A short distance below the lower cross-head 9 of frame $10^a$ a sleeve 21 is loosely mounted on the vertical shaft 8, and at its upper end said sleeve is provided with laterally-projecting arms 22, to the free ends of which vertical rods 23 are secured. The rods 23 extend up through the tubular uprights 10 and project some distance above the upper ends of the latter. At the upper ends of the rods 23 devices for holding the tube C to be applied to the bulb are located, a detail description of which will now follow.

A yoke or cross-head 24, having thumb-pieces $24^a$ at its ends, is secured to the rods 23 near the upper ends of the latter and provided at its center with an enlargement having a conical opening 25 therein, the larger end of said opening being coincident with the under face of said enlargment. Another yoke or cross-head 26, having thumb-pieces $26^a$, is loosely mounted on the rods 23 above the yoke or cross-head 24 and adapted to bear upwardly against enlargements 27 on collars 28, secured to the upper extremities of said rods 23. The yoke or cross-head 26 is made centrally between its ends with an annular enlargement 29, within which a block 30 is swiveled. The swiveled block 30 is made with a central screw-threaded opening for the reception of the screw-threaded upper end portion of a chuck or clamp 31 for the reception of the tube C. The chuck or clamp 31 comprises a base portion, screwed to the swiveled nut 30, and two or more spring-arms 32, having beveled enlargements 33 at their lower ends, said enlargements constituting, collectively, a conical lower end to the chuck, and are disposed in the conical opening 25 on the lower yoke or cross-head 24. A spring 34 encircles the chuck 31 and bears at its respective ends against the yoke or cross-head 24 and the swiveled block 30 in the upper yoke or cross-head 26, the said spring thus exerting its resilience to force the latter upwardly. When the yoke or cross-head 26 is thus pressed upwardly, the enlargements 33 of the chuck will be cramped in the conical opening 25 in the lower yoke 24 and made to clamp the tube 6 and hold it in proper position immediately over the bulb B and exactly in line with the longitudinal axis of the latter.

In order to open the chuck to insert a tube C or to remove the chuck from the latter, the thumb-pieces $24^a$ $26^a$ at one end of the respective yokes or cross-heads 24 26 will be grasped and pressed by the operator, thus causing the upper yoke or cross-head 26 to turn on one of the collars 28 as a fulcrum and lower the conical lower end of the chuck in the conical opening in the lower yoke or cross-head 24.

In order that a hole 35 be made in the upper end of the bulb to communicate with the tube C, it is necessary that the bulb be softened at the proper point by means of jets of flame. This will be accomplished by blow-pipes 36 36$^a$ of any suitable construction, which project jets from opposite sides of the bulbs, so that the combined effect of the two jets will soften the top of the bulb at a point in line with the longitudinal axis thereof. The blow-pipe 36 is mounted on an arm 36$^b$, having a collar 36$^c$, and the latter is adjustably secured to the post 1 by means of a suitable set-screw 36$^d$. The blow-pipe 36$^a$ is similarly mounted on an arm 36$^e$, having a sleeve 36$^f$, the latter being secured to a post 36$^g$, secured in the upper end of the standard c. While the bulb is being thus heated it is desirable that it be rotated, and for this purpose the lower end of the vertical shaft 7$^c$ is provided with a horizontally-disposed friction-wheel 37, which receives motion from a vertically-disposed friction-wheel 38, carried by a horizontal shaft 39. The shaft 39 is mounted on brackets 40, located on the braces d. A pulley 41 is secured to the shaft 39 and receives motion from any convenient source of power by means of a suitable belt, which latter will be properly guided by rollers 42 43, mounted in an arm 44, secured to the standard b.

As before stated, several sets of devices such as above described for holding and manipulating the bulb B and tube C are employed and carried by the revoluble disk or table 2, so that while one bulb is being operated upon to apply the tube C other bulbs can be placed in position ready to be moved between the jets when the operations on the first bulb shall have been completed. Now it is apparent that when the disk or table 2 is moved (which may be done manually) to carry one set of devices from their operative position and another set of devices carrying a bulb into position to be operated upon it is a matter of importance that means be provided whereby to hold the mechanism in exactly the proper position relatively to the blow-pipes and prevent any movement of the disk or table 2 while the bulb is being operated upon. For this purpose the devices now to be described will be employed.

A yoke 45, Figs. 1 and 8, is secured to the standard c and projects toward the standard b. At its center the yoke 45 is made with a perforation which constitutes one bearing for a longitudinally-movable rod 46, said rod also having a bearing in a perforated enlargement 47 on the standard c. One end of the rod 46 is provided with a head or catch 48, adapted to engage a collar 49, loosely mounted on the vertical shaft 8, (or short shaft 7$^e$,) and thus hold the latter and all parts carried thereby in their proper operative positions. In order that the catch 48 may be automatic in its operation of engaging the collar on the shaft 8 (or short shaft 7$^e$) when the disk or table 2 is turned, a spring 50 is employed. The spring 50 encircles the rod 46 and a sleeve 51 on said rod, said spring bearing at one end against the standard c and at the other end against a collar 52 on the sleeve 51. The sleeve 51 is made with slots 53, through which pins 54 on the rod 46 project, said pins being adapted to bear against the flange 52.

A bell-crank lever 55 is pivoted to the standard c below the yoke 45, and the upwardly-projecting arm 56 of said lever is bifurcated at its upper end to receive the rod 46 and engage the projecting ends of a pin 57 at the rear end of said rod. To the free end of the arm 56$^a$ of the bell-crank levers one end of a rod 58 is pivoted, the other end of said rod being pivotally attached to a foot-lever 59 connected to the lower portion of the standard c.

It will be seen that by operating the foot-lever 59 the catch 48 will be withdrawn and the shaft and parts carried thereby released, so that the disk or table 2 can be rotated and another shaft 8, &c., brought into position.

It is desirable for a purpose which will be hereinafter explained in the description of the operation of the apparatus that the bulb B and tube C be moved vertically independently of each other and while they are rotating. I will first describe the appliances used for moving the bulb vertically and will then proceed to explain the construction of the devices employed for moving the tube C up or down, it being understood, of course, that each set of devices will be provided with means for accomplishing the raising and lowering of the bulb and tube.

A collar 60 is loosely mounted on the shaft 8 between the arms 7 and prevented from moving vertically on the shaft by means of collars 61 61, secured to the latter. A bifurcated lever 62 is pivoted at one end to the arm 5, pivoted to collar 60, and at its other end projects some distance beyond the shaft 8, the free end 63 of said lever terminating (when the parts are in operative position) at a point in proximity to the standard c, where it will be received by a clutch 64, Fig. 9, and the latter is provided with curved arms 65, which serve to properly guide the end of the lever 62 to and from its proper position between the jaws of the clutch. The clutch 64 is mounted to slide vertically on the post or shaft 36$^g$ in the upper end of the stand, being prevented, however, from rotation by means of a pin 65, which passes through the clutch and through an elongated slot 66 in said post or shaft 36$^g$. The pin 65 may also serve to pivotally connect the arm 67 of a toggle-lever to said clutch. The other arm 67$^a$ of said toggle-lever is pivotally connected to the upper end of the standard c. At the junction of the arms of the toggle-lever a rod 68 is connected and pivotally connected between its ends to the standard c, the lower end of said rod terminating at or near the base of the apparatus in a stirrup 69. From this construction and arrangement of parts it will be seen that by swinging the stirrup 69 in one direction the clutch 64 will be lowered and with it the end of the lever 62 connected thereto. The lever being thus turned on its pivotal connection with the arm or bracket 5, the hollow shaft 8 (to which lever is attached) will be made to descend independently of the tube 20, the latter being prevented from such downward movement by its engagement with the pin $7^f$.

It is evident that when the stirrup 69 is moved in the other direction the vertical shaft will be raised, so that by operating the stirrup the vertical shaft and the bulb B supported thereby can be raised and lowered and said bulb be properly adjusted in the flame. The ability to lower the shaft 8 independently of the tube 20 results not only in allowing the bulb to be moved relatively to the flame, but also in permitting the operation of a punch 70 to form the hole in the end of the bulb with which the tube C is to communicate when it becomes necessary to employ a punch, as when the glass of the bulb is unusually thick. Ordinarily, however, the said hole in the bulb will be formed by air-pressure within the bulb, as hereinafter fully explained. The punch 70, above referred to, is carried by the upper end of a section 71 of tube, which, in effect, constitutes a continuation of the tube 20, said section 71 of tube being made with perforations 72 for the escape of air into the bulb. It is apparent that when the shaft 8 is lowered, as above explained, the bulb B will be brought down onto the punch 70 and the latter caused to penetrate the softened end of the globe and form a hole therein, with which hole the tube C, subsequently welded to the bulb, will be made to communicate. It is necessary, therefore, that means (hereinbefore alluded to) be provided for moving the devices which carry the tube C vertically independently of the bulb, so that the said tube C can be first lowered onto the bulb at the proper time to be welded to it, and then subsequently raised to form a small neck 73. The devices employed for moving the tube C vertically will now be explained.

The sleeve 21 is recessed for the accommodation of a loosely-disposed collar 75, which latter is pivoted at diametrically opposite points within a yoke 76, said yoke forming part of a lever 77. The lever 77 is provided at one end with a handle 78, and at the other end said lever is made with an arm 79, which loosely fits in a sleeve 80. The sleeve 80 is pivotally connected to the upper end of a screw 81, and the latter passes through an arm 82, mounted loosely on and projecting laterally from the shaft 8. The shaft 8 can revolve freely within the portion of the arm 82, mounted thereon, but vertical movement of said arm relatively to the shaft is prevented by collars 83 $83^a$, secured to said shaft above and below the arm 82, respectively. Thus it will be seen that by moving the lever 77 in one direction or the other the sleeve 21, the rods 23, and the devices carried by said rods for holding the tube C will be moved vertically, so as to cause the tube C to move toward or recede from the bulb B. The rods 23 and the devices connected therewith will be maintained in the positions to which they may be moved by the manipulation of the lever 77 by means of pins 84, projecting through holes in the cross-head 9, said pins being carried by and made to have frictional engagement with the rods 23 by a flat spring 85, secured between its ends to said cross-head 9.

A disk or block 86 is secured to the central post 1 of the machine, and this disk or block is made in its under face with a curved recess or chamber 87, Fig. 10, with which a duct or hole 88 in the disk or block communicates. A cock 89 communicates with the hole or duct, and with said cock a suitable pipe is connected for conducting air under pressure thereto.

Immediately under the disk or block 86 another disk or block 90 is located and secured to the collar 3, said disk or block 90 being thus adapted to move with the table 2.

The disk or block 90 is made with a series of L-shaped ducts 91, one of such ducts being provided for each set of devices for carrying and manipulating the bulbs. With each duct 91 a pipe 92 communicates, and with each pipe 92 a flexible tube 93 is connected. The other end of each tube 93 is attached to a pipe 94, Fig. 7, which constitutes one of the pivotal connections between the respective yokes 76 and the collars 75. The collar 75 is made with a short duct 95, which communicates at one end with the pipe 94, and is adapted to discharge air into the tube 20 through holes 96 therein and through the open lower end of said tube 20, through which it will pass and escape into the bulb through the holes 72 in the section 71 of said tube. A spring-clamp 97 is attached to the lever 77, and between said clamp and lever the flexible tube 93 passes, the clamp serving to compress the tube and normally close the same.

From the construction and arrangement of parts above described it will be seen that the disks or blocks 86 and 90 constitute a valve, so that only the bulb being treated will receive air, and that the supply of air to the bulb being treated can be controlled by manipulating the clamp 97. It is not essential that the particular clamp 97 shown in the drawings be used, as any suitable device for compressing the flexible tube may be employed.

The mode of operation of our improved apparatus is as follows: A bulb having been placed in position, as hereinbefore explained and as shown in the drawings, the tube C having been placed in position, and the air-conducting devices having been properly adjusted, the arm of the apparatus carrying the bulb B and tube C to be operated upon will be swung around, so as to bring the top of the bulb in line with the jets of flame and locked, as heretofore explained. The parts will then be in the positions shown in Fig. 4, and the wheel 37 having moved in contact with the wheel 38 the shafts 8 7ᶜ and the bulb and tube carrying devices will be rapidly rotated. As the bulb revolves in the flame air-pressure will be allowed to enter the bulb by the manipulation of the clamp or valve 97, which air-pressure will cause a hole to be blown in the end of the bulb, which hole will be perfectly central in the end of the bulb and exactly in line with the longitudinal axis of the tube 20. As soon as an opening has been blown in the bulb the air-pressure will be shut off and the lever 77 operated to lower the tube C onto the bulb, as shown in Fig. 6, and welded in place, air-pressure being applied from time to time, at the will of the operator, to keep the opening free through the tube. Where the tube has been completely welded to the bulb, it is moved from the fire by unlocking the arm of the apparatus which carries it. The tube C will then be drawn out by operating the lever 77 to form the small neat tube or neck 73 for final sealing of the lamp. Air will be applied while the tube is being drawn out, the bulb having been moved only a short distance out of the flame and the curved recess or chamber 87 in the block or disk 86 being of sufficient length to aline with the duct 91 in the disk or block 90 when the arm of the apparatus carrying the bulb shall have been moved a short distance from its operative position.

The great advantage of machine-work over the former method of applying tubes C by hand is cheapness and the great accuracy and uniformity of the work. As will be seen, the bulb will always be perfectly central as it revolves concentric with the spindle in the fire. Another advantage is the short length of tube C which can be used as compared with the size of such tube when applied by hand. The tubes C applied by our machine are so short that they could not be applied by hand.

Various changes might be made in the details of construction of our invention without departing from the spirit thereof or limiting its scope, and hence we do not wish to limit ourselves to the precise details of construction herein set forth; but, Having fully described our invention, what we claim as new, and desire to secure by Letters Patent, is—

1. A machine comprising a bulb-holder, means for forming a hole in the enlarged end of the bulb, devices substantially such as described for welding a tube to said bulb so as to communicate with said hole, substantially as set forth.

2. The combination with devices for holding the bulb of an incandescence electric lamp and devices for holding a tube to be welded to said bulb, of devices for moving both sets of devices, relatively to each other, substantially as set forth.

3. The combination with devices for holding the bulb of an incandescence electric lamp and devices for holding a tube to be applied to said bulb, of means for revolving both sets of devices simultaneously, and means for moving said sets of devices independently of each other while they are revolving, substantially as set forth.

4. The combination with means for holding the bulb of an incandescence electric lamp, of devices for holding a tube to be welded to said bulb, means for heating the end of the bulb and forming a hole therein, and means for moving said devices toward and away from the bulb, whereby to first place the tube on the end of the bulb and weld it thereto and then draw the tube out so as to form a small neck projecting from the bulb and communicating with the opening therein, substantially as set forth.

5. The combination with a shaft, and bulb-holding and tube-holding devices carried by said shaft, of means for moving said bulb-holding and tube-holding devices independently of each other, substantially as set forth.

6. The combination with a shaft and bulb-holding and tube-holding devices carried by said shaft, of means for revolving said shaft, and means for moving said bulb-holding and tube-holding devices while the shaft is revolving, substantially as set forth.

7. The combination with two standards and a revoluble disk or table mounted on one of said standards, of an arm or bracket secured to said disk or table, a shaft carried by said arm or bracket, bulb and tube holding devices carried by said shaft, and a spring-actuated locking device mounted in the other standard and adapted to engage a collar on said shaft, substantially as set forth.

8. The combination with two standards, a revoluble disk or table mounted on one of said standards, and a bracket secured to said disk or table, of a shaft carried by said bracket, bulb and tube holding devices carried by said shaft, a yoke secured to the other standard, a spring-actuated locking-bolt mounted in said yoke and adapted to engage a collar on said shaft, a bell-crank lever adapted to engage said bolt to withdraw it, a rod connected at one end to said bell-crank lever, and a foot-lever connected to the other end of said rod, substantially as set forth.

9. The combination with an arm or bracket and a shaft mounted thereon, of bulb-holding devices carried by said shaft, a loose collar on said shaft, means for preventing movement of said collar longitudinally on the shaft, and a pivoted lever pivotally connected to said loose collar for moving the shaft longitudinally and raising and lowering the bulb carried thereby, substantially as set forth.

10. The combination with two standards, a movable arm carried by one standard and a clutch mounted in the other standard, of a shaft mounted in said arm, a collar mounted loosely on said shaft, means for preventing longitudinal movement of said collar, a pivoted lever pivotally connected to said collar and adapted to engage the clutch and means for moving said clutch whereby to turn said lever on its pivot and raise or lower the shaft and the bulb carried thereby, substantially as set forth.

11. The combination with two standards, a movable arm carried by one of said standards, and a clutch having curved guide-arms, mounted to move vertically in the other standard, of a shaft mounted in said movable arm, bulb-holding devices carried by the shaft, a pivoted lever connected with said shaft and adapted to engage said movable clutch, a toggle-lever connected to said movable clutch, a pivoted rod connected to said toggle and a stirrup on said rod, substantially as set forth.

12. The combination with a shaft, of a frame secured to one end thereof, one end of said frame being adapted to receive one end of an incandescence-electric-lamp bulb, and a yielding cross-head between the ends of said frame adapted to receive the other end of said bulb, substantially as set forth.

13. The combination with a shaft, of a frame secured thereto, one end of said frame being adapted to receive one end of an incandescence-electric-lamp bulb, a yielding cross-head between the ends of said frame, and a stopper carried by said cross-head and adapted to enter the other end of said bulb, substantially as set forth.

14. The combination with a shaft, of a frame secured thereto, one end of said frame being adapted to receive one end of a bulb, a spring-actuated cross-head between the ends of said frame, a core secured to said cross-head and a rubber stopper secured to said core and adapted to enter the other end of said bulb, substantially as set forth.

15. The combination with a shaft, of a frame secured thereto, one end of said frame being adapted to receive one end of a bulb, a spring-actuated cross-head between the ends of said frame, a hollow stopper carried by said cross-head and adapted to enter the other end of the bulb and a tube communicating with the hollow stopper whereby to conduct air under pressure to said bulb, substantially as set forth.

16. The combination with a shaft, and a frame secured thereto, one end of said frame being adapted to receive one end of a bulb, of a spring-actuated cross-bar between the ends of said frame, a hollow stopper secured to said cross-head and adapted to enter the other end of the bulb, means for conducting air under pressure to said hollow stopper, a perforated tube communicating with the stopper, and a punch on the end of said perforated tube, substantially as set forth.

17. The combination with a hollow shaft, and a frame secured thereto, one end of said frame being adapted to receive one end of a bulb, of a yielding cross-head, a hollow stopper carried by said cross-head and adapted to enter the other end of the bulb, a tube communicating at one end with the hollow stopper and at the other end with the hollow shaft, a flexible tube for conducting air under pressure to said hollow shaft, and a clamp for compressing said flexible tube whereby to control the passage of air through it, substantially as set forth.

18. The combination with a hollow shaft and a bulb-carrying frame secured thereto, of a cross-head in said frame carrying a hollow stopper to enter the neck of the bulb, a perforated tube extending through said stopper and having a punch at its upper end, said tube terminating at its lower end near the lower end of the shaft, a pin passing through a slot in the shaft against which said tube bears, a short hollow shaft on the first-mentioned shaft through which short shaft, said pin also passes, an arm or bracket in which said shafts are mounted, means for rotating said shafts, and means for moving the first-mentioned shaft longitudinally, substantially as set forth.

19. The combination with a standard, a revoluble table mounted thereon and an arm or bracket secured to said disk or table, of a shaft mounted in said arm or bracket, bulb-holding devices carried by said shaft, an air-valve connected with said standard and revoluble disk or table, and a connection between said valve and the bulb-holding devices whereby air under pressure can be discharged into the bulb carried by said holding devices, substantially as set forth.

20. The combination with a standard, a revoluble table mounted thereon, and arms secured to said revoluble table, of a shaft mounted in each arm, bulb-holding devices secured to each shaft, a disk secured to said standard and having an air-chamber therein, an air-cock communicating with said chamber, a disk carried by the revoluble table and having ducts therein to communicate successively with said air-chamber, connections between said ducts and the bulb-holding devices, whereby to conduct air under pressure to the interior of the bulbs carried by said holding devices and means for regulating the entrance of air to the bulb, substantially as set forth.

21. The combination with a revoluble shaft and a bulb-holder carried thereby, of a tube-holder disposed over the bulb-holder, and a lever connected with said tube-holder for moving it independently of the bulb-holder, substantially as set forth.

22. The combination with a shaft and a bulb-holder secured thereto and having tubular uprights, of a tube-holder disposed over the bulb-holder and carried by rods passing through said tubular uprights, a sleeve mounted on the shaft, to which said rods are connected, and a pivoted lever connected to said sleeve whereby to move the tube-holding devices vertically, substantially as set forth.

23. The combination with a shaft and a bulb-holder carried thereby and having tubular uprights, of a tube-holder disposed over the bulb-holder, rods connected to the tube-holder and passing through the tubular uprights of the bulb-holder, a collar mounted on the shaft, to which said rods are connected, an arm mounted loosely on said shaft, means for preventing longitudinal movement of said arm on the shaft, a screw secured to said arm, a sleeve pivoted to said screw, and a lever having one end mounted in said last-mentioned sleeve and having pivotal connection between its ends with the sleeve on the shaft, substantially as set forth.

24. The combination with a shaft and a bulb-holder carried thereby, having tubular uprights, of a tube-holder over the bulb-holder, rods connected to the tube-holder, a sleeve on the shaft, to which sleeve said rods are connected, a lever connected with said sleeve for moving said tube-holder, a spring secured to the bulb-holder and pins at the ends of said spring, said pins being adapted to engage the rods of the tube-holder and retain the latter in the position to which it may be moved, substantially as set forth.

25. The combination with a bulb-holder, and rods projecting above the same, of a tube-holder, comprising two cross-heads, and a chuck carried by said cross-heads, one of said cross-heads being secured to said rods, the other cross-head being adapted to have a pivotal movement on one or the other of said rods, and a spring disposed between said cross-heads, substantially as set forth.

26. The combination with a bulb-holder and rods projecting above the same, of a cross-head having a loose connection with said rods, a cross-head secured to said rods, a chuck mounted in said cross-heads, a spring between said cross-heads and thumb-pieces on the ends of said cross-heads.

27. The combination with a bulb-holder, and rods projecting above the same, of a rod pivotally connected to said rods, a chuck carried by said cross-head, said chuck comprising spring-arms having beveled enlargements which collectively form a conical clamp, a cross-head secured to said rods and having an opening with inclined wall for the reception of said conical clamp and a spring disposed between said cross-heads substantially as set forth.

In testimony whereof we have signed this specification in the presence of two subscribing witnesses.

GEORGE R. LEAN.
JOHN R. MASSEY.

Witnesses:
WARREN H. MUSSER,
JOHN M. STRONG.